United States Patent [19]

DeRyke et al.

[11] 4,148,582
[45] Apr. 10, 1979

[54] PROGRAMMABLE MICROFICHE DUPLICATOR AND SORTER APPARATUS

[75] Inventors: Thomas V. DeRyke, Libertyville; Kenneth J. Fedesna, Des Plaines, both of Ill.; Ronald D. Elms, Chagrin Falls, Ohio

[73] Assignee: Addressograph-Multigraph Corporation, Los Angeles, Calif.

[21] Appl. No.: 791,524

[22] Filed: Apr. 27, 1977

[51] Int. Cl.² ..................... G03B 27/02; G03B 27/08
[52] U.S. Cl. ....................................... 355/97; 355/78; 355/64; 355/50
[58] Field of Search .................. 355/64, 65, 54, 50, 355/51, 40, 27–29, 95, 97, 99, 100, 102, 53, 78, 96, 18

[56] References Cited

U.S. PATENT DOCUMENTS

| 3,740,136 | 6/1973 | Maloney et al. ................ 355/65 X |
| 3,827,312 | 8/1974 | Bristol et al. ...................... 74/436 |
| 3,922,084 | 11/1975 | Burton et al. .................. 355/50 X |

Primary Examiner—L. T. Hix
Assistant Examiner—W. J. Brady
Attorney, Agent, or Firm—Michael A. Kondzella; George Jameson; Harry M. Fleck, Jr.

[57] ABSTRACT

A programmable microfiche duplicator and sorter apparatus is provided, including control means which operate in accordance with input data received from a teletype or other remote input peripheral, or from a code carried by the master film. The input data is stored in memory and defines the number of copies to be made, the sorter mode and the sorter start position for collation operations.

11 Claims, 13 Drawing Figures

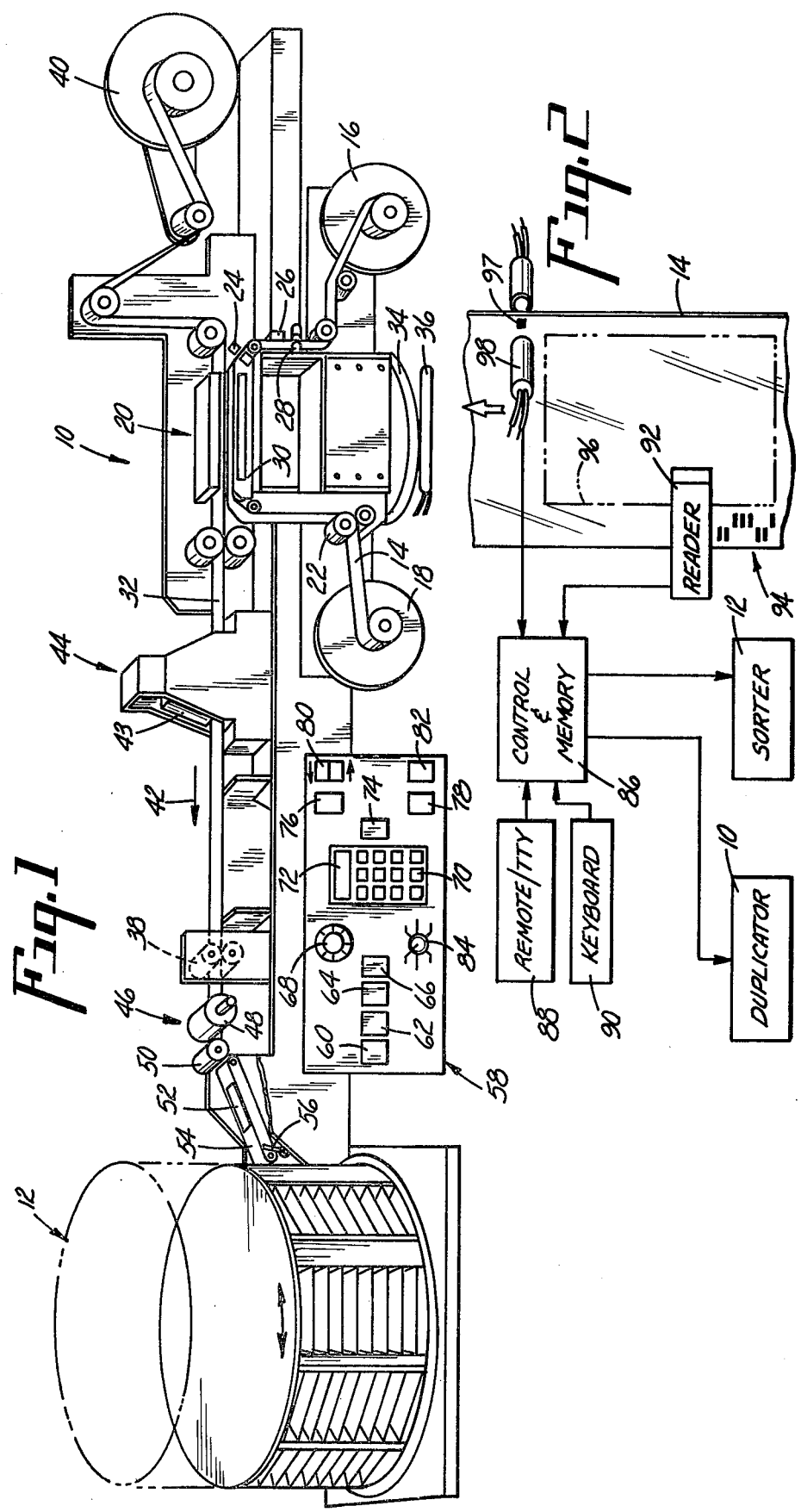

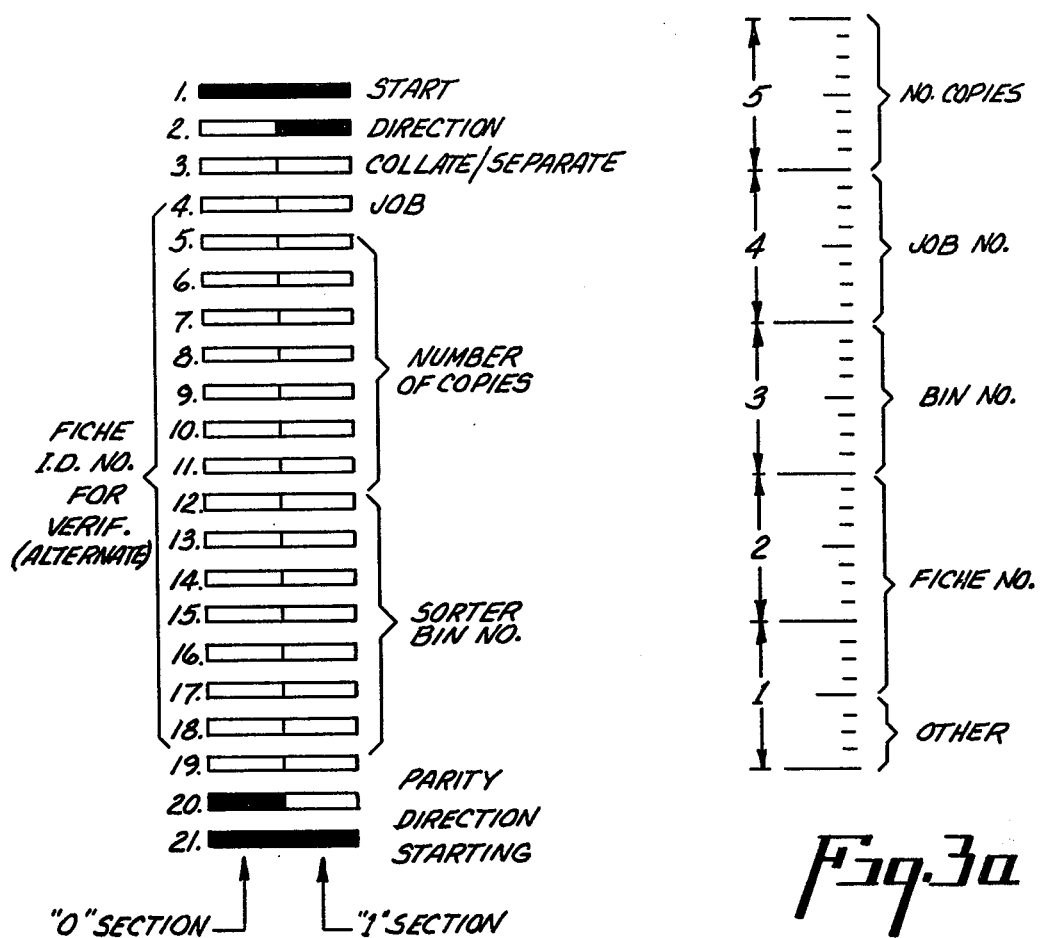
Fig. 3
Fig. 3a
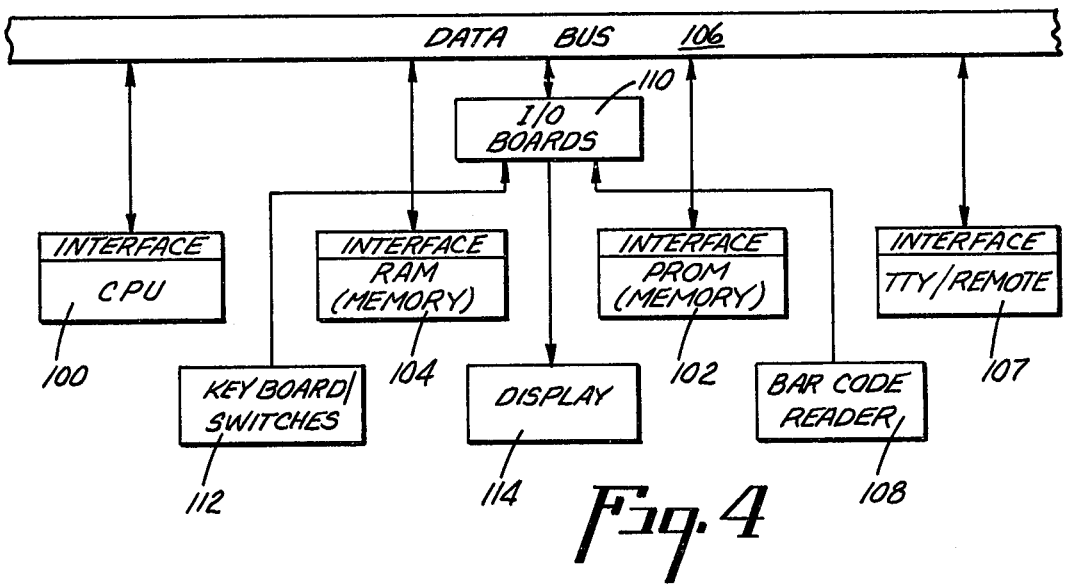
Fig. 4

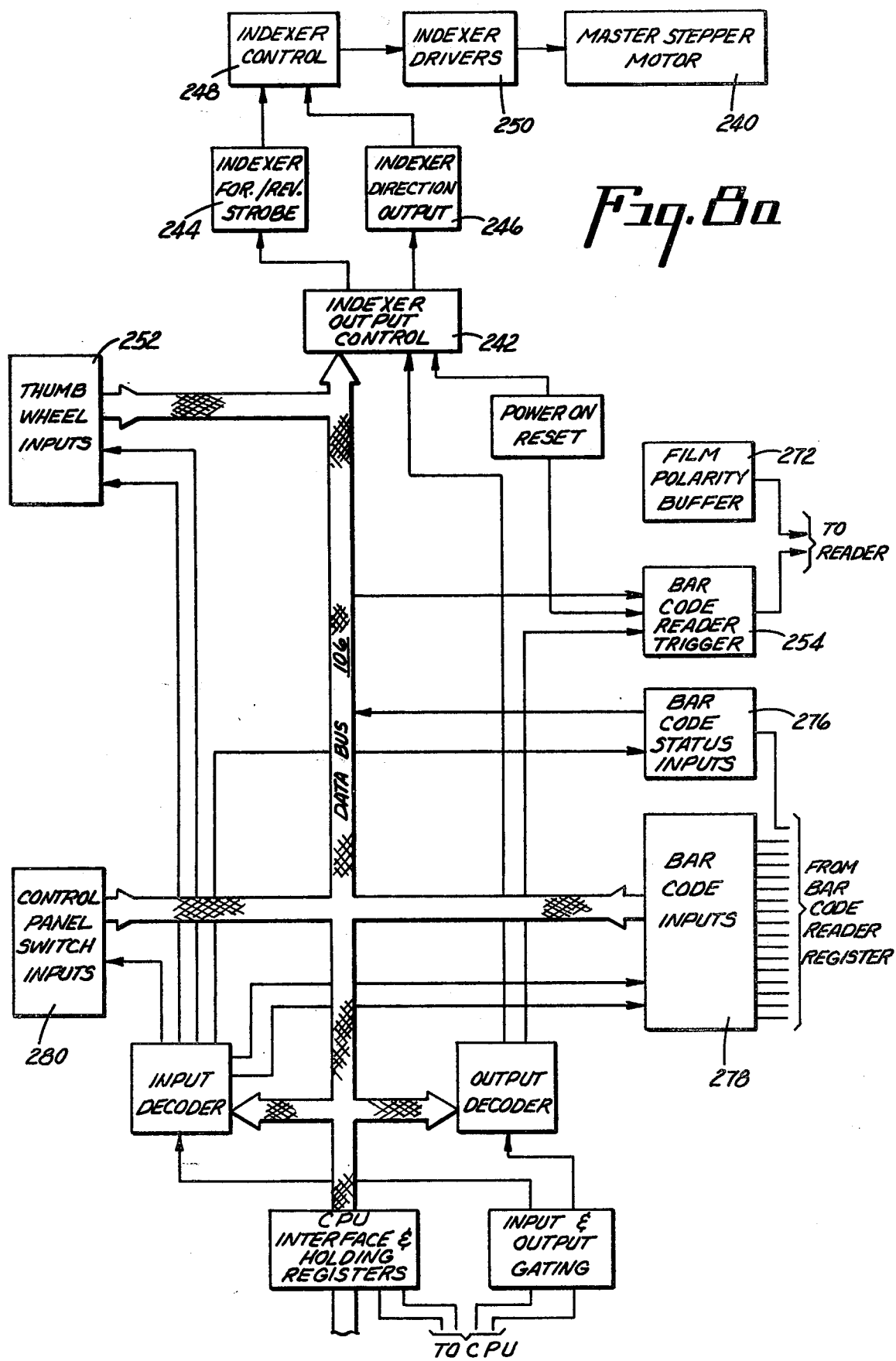

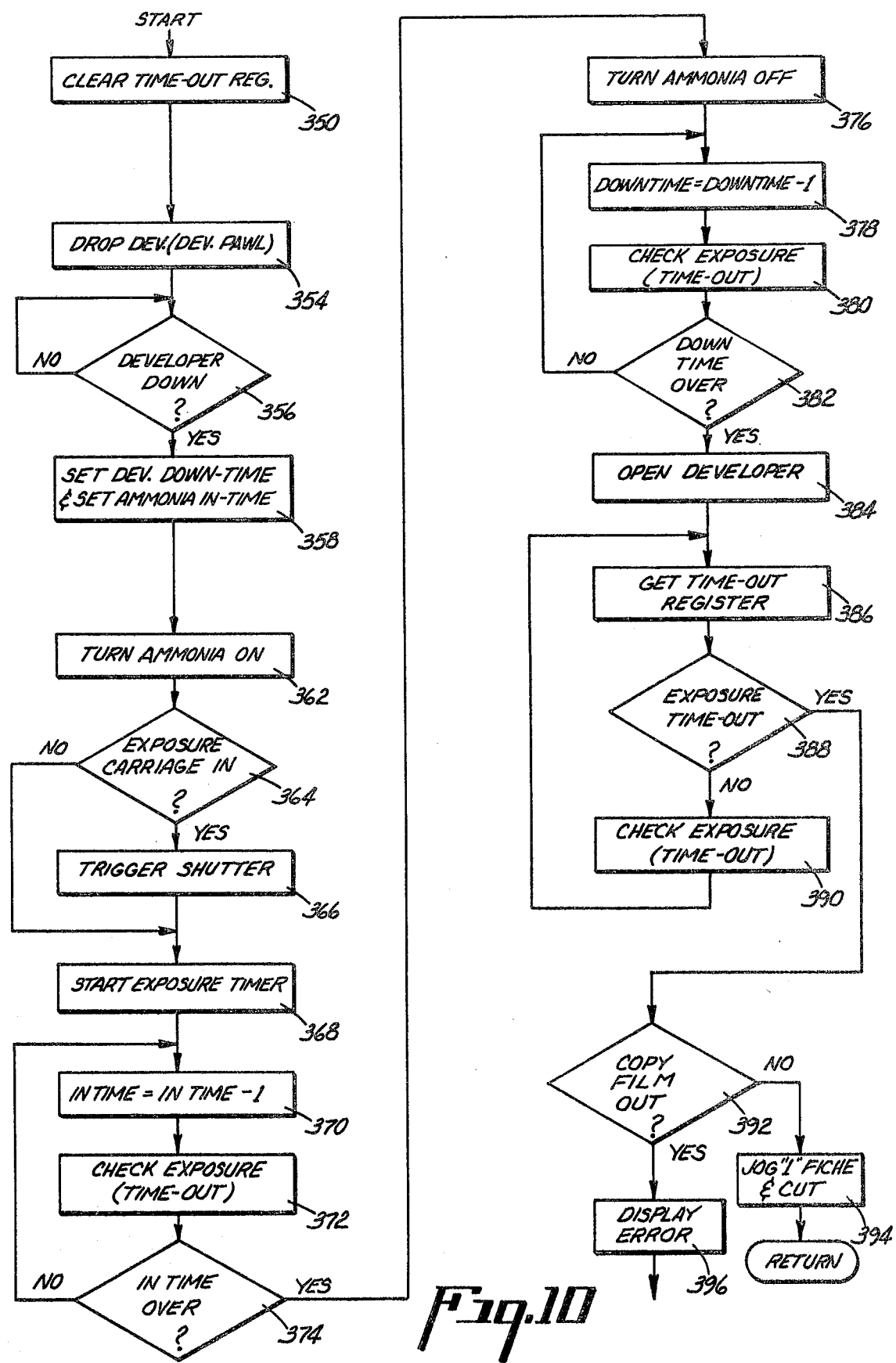

PROGRAMMABLE MICROFICHE DUPLICATOR AND SORTER APPARATUS

BACKGROUND OF THE INVENTION

The present invention is generally related to micrographics and, more particularly, to an improved microfiche duplicator and sorter apparatus which is programmable from several input sources.

In recent years, micrographics technology has played an ever increasing role in the business community as an efficient, convenient means for storing and retrieving large amounts of data. An enormous amount of printed information can be stored on microfilm or microfiche frames and readily retrieved by various commercially available reading devices. Significant improvements have been made recently which include the use of computer output microfilm (COM) units which produce microfilm from the output of a computer. Also, sophisticated reading devices are now available which provide automatic searching through the film or fiche files to display frames selected through an operator keyboard.

Many present day micrographics applications call for large numbers of copies to be distributed to various customers or subscribers. For example, large banks and other financial institutions are utilizing micrographics as a means for record keeping at their central office and branch locations. In addition, many businesses are utilizing microfiche as a substitute for printed catalogs and spare parts information. In many cases, businesses require nationwide distribution of microfiche copies to its customers or distributor outlets. These and other applications require large number of fiche copies which, in many cases, must be replaced periodically with copies containing updated information.

In order to meet the demand requirements of such applications, various microfiche duplicators have been proposed or manufactured which operate at speeds capable of producing over 1,000 fiche copies per hour. However, such machines, in spite of their speed capabilities, have been found to be less than satisfactory for applications requiring large distributions of fiche on a periodic basis for updating information concerning financial transactions and the like. For such applications, it would be desirable to provide an apparatus capable of receiving control data or instructions from a remote source and producing fully collated or separated copies which may be quickly and conveniently distributed to various subscribers.

Therefore, it is an object of the present invention to provide a novel microfiche duplicator and sorter apparatus which may be operated under control of program instructions inputted from various sources to produce collated or separated fiche copies.

Another object of the present invention is to provide a unique microfiche duplicator and sorter apparatus which may be programmed from data contained on a master film to control both the duplicator and sorter operations without the need for operator intervention during a copy run.

It is a further object of the present invention to provide a versatile control means which synchronizes operations of the duplicator stations with those of a sorter in accordance with program instructions to produce collated or separated microfiche copies.

Still another object of the present invention is to provide an improved high-speed microfiche duplicator which is highly versatile, convenient to operate, and relatively inexpensive to maintain.

SUMMARY OF THE INVENTION

The present invention provides an apparatus which produces sorted microfiche copies at high speeds and which may be controlled by program instructions received from a remote computer, teletype, or other input peripheral. In addition, instructions may be inputted from data read from a bar code or the like on the master film. In one embodiment, the bar code data includes sorter mode, number of copies to be produced, and bin position information for the sorter.

Instructions received from the teletype, remote, or bar code source are stored in memory and utilized to control both the duplicator and sorter operations without significant operator intervention. It is possible to run copies of a large number of fiche on the master roll and collate or separate such copies under control of the input instructions. Once the master roll has been loaded in the duplicator, orders may be filled under control of instruction from a remote ordering center for, say, a financial institution requiring rapid distribution of fiche copies to various branch locations. The control indexes the master film through various image areas specified by the instructions and makes the required number of copies and collates and separates such in accordance with the instructions.

If the master film is produced with bar code instructions, the apparatus may be operated in a bar code mode to automatically index the master film through a sequence of image areas, making the specified number of copies of each area and automatically collating or separating such copies in accordance with the bar code data.

IN THE DRAWINGS

FIG. 1 is a simplified perspective view of the duplicator and sorter apparatus of the present invention.

FIG. 2 is a simplified block diagram of the control system illustrated with a section of master film bearing bar code data.

FIG. 3 is an illustration of one form of the master bar code format utilized with the present invention.

FIG. 3a is an illustration of a remote peripheral data packet format.

FIG. 4 is a simplified block diagram of the control system associated with the present invention.

FIG. 8a is a block diagram of a third input/output circuit board of the control system.

FIG. 8b is a block diagram of the bar code reader circuitry associated with the circuitry of FIG. 8a.

FIG. 10 is a flow chart of a program sub-routine for making a fiche copy.

DESCRIPTION OF THE PREFERRED EMBODIMENT

Figure 5:
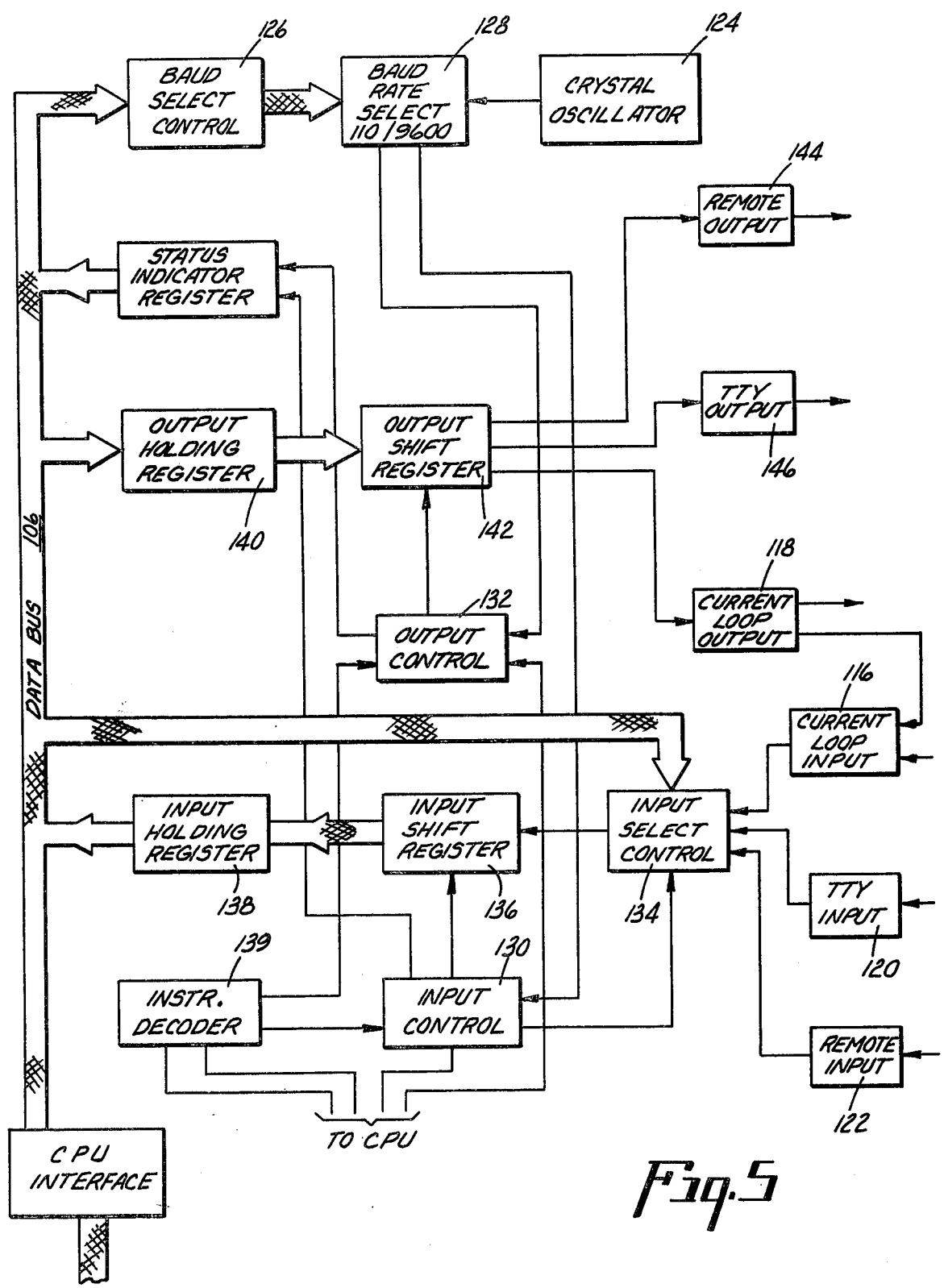
FIG. 5 is a block diagram of the serial interface circuit for handling teletype and remote data.

Referring now, more particularly, to FIG. 1 of the drawings, the duplicator associated with the present invention is generally indicated by the numeral 10 and produces microfiche copies which are delivered to a sorter apparatus generally indicated at 12. An elongated master film 14 moves between a supply spool 16 and a take-up spool 18 to present the selected image areas to an exposure station, generally indicated by the numeral 20. The master film is indexed by a transport system including an indexing capstan 22 which pulls the film from the take-up spool past the exposure station. Torque motors, not illustrated, are coupled to the supply and take-up spools to continuously apply torques in opposite directions to hold the master film web under slight tension during both advance and re-wind operations.

The master film is divided into a series of image areas, each corresponding to a fiche to be produced by the duplicator. Each image area is provided with an opaque or transparent mark which is detected by an optical mark sensor 24 as the film is advanced. A read head 26 is provided for sensing bar code data from the master film as it is advanced to the exposure station 20. In addition, an air flow sensor 28 is provided for detecting the absence of the master film web to deenergize the torque motors and transport when the supply spool has been exhausted, or when the film is rewound.

The exposure station is provided with a platen 30 upon which the master film rests during each exposure operation. The exposure platen is reciprocated vertically by an appropriate mechanism, not illustrated, to bring the image area of the master film into contact with a corresponding section of copy film 32. While the copy and master films are pressed together, an exposure shutter 34 is operated for a predetermined time interval to illuminate the film with radiation from an exposure lamp 36, preferably of the metal halide type. The exposure platen, together with the underlying master film assembly are moveable horizontally to slide out to a loading position. This allows the operator to load separate fiche or thread the master film. The assembly is pushed manually into the exposure station where it is latched in place by a solenoid operated mechanism.

After each exposure operation, platen 30 is lowered and copy film 32 is advanced one fiche length by an index capstan 38. This provides an unexposed section of copy film to the exposure station. The copy film is furnished from a supply spool 40 and is advanced incrementally in a direction indicated by arrow 42. The film passes through a developer station 44 located two fiche lengths from the exposure station. The developer illustrated is for developing the image on diazo film with ammonia and high temperature. It includes a moveable head 43 which is lowered by the control to press the copy film tightly against the developer base where a pliable gasket forms a gas-tight seal against the film surface. This defines a gas chamber into which ammonia is fed and held for a predetermined time interval to develop the film. The ammonia is then exhausted to an absorber, not illustrated, and the control opens the developer to allow the copy film to be indexed to the next position provided the exposure cycle has timed out.

The duplicator is provided with a cutting station 46, including a rotary cutter 48 which cuts the film into sections or fiche. The cut fiche passes an anti-static member 50 which removes any electrostatic charges which might cause the fiche to stick together. Each fiche, such as that illustrated at 52, is then advanced by a stacker transport 54 to a waiting bin of sorter 12. A solenoid-operated finger 56 pushes each fiche on the trailing edge to assure that such is inserted fully into the sorter bin. Preferably, sorter 12 is of the type disclosed by U.S. Pat. No. 3,827,312 to Bristol et al and is a commercially available item sold by Addressograph-Multigraph Corp. under the registered trademark OP-80. The fiche-receiving bins are arranged in a helical array on a vertically movable platform. Positioning is achieved through a Geneva type drive which indexes the sorter from one bin position to the next.

The apparatus includes a main control panel 58 comprised of the controls and indicators required by the operator to start, program and run the apparatus. The controls include a main on-off switch 60 which applies power to the equipment and causes the sorter to automatically home. An Exposure Lamp switch 62 is provided for selectively energizing the exposure lamp. Jogging of the copy film is achieved by way of switch 64 and serves to advance the copy film one fiche length and actuates the rotary film cutter. When receiving program instructions from a remote CPU or the like, a Remote Initiate switch 66 is operated to set the data rate at some predetermined value. In the preferred embodiment, this is set at 9600 baud. Operation of switch 66 is also effective to cause the transmission of a sychronization character to the remote source. Data transfer from the remote source is initiated upon receipt of the synchronization character acknowledgement.

An Exposure Time control 68 is provided for setting the time interval during which the copy film is to be exposed. A keyboard 70 allows the operator to make various entries, including programming of the machine. A display 72 provides a read-out of at least some of the keyboard entries and provides error signal in the event of a malfunction or other problem detected by the control. When the exposure platen is in place, depression of a Copy Start switch 74 causes initiation of various functions, depending upon the particular mode in which the machine is operating. A Platen Eject switch 76 is provided for causing the exposure platen to be ejected from the exposure station for the purpose of loading individual master fiche or threading the master film. A Master Rewind switch 78 is provided for causing the master film to be re-wound onto supply spool 16. The master film may be moved in the forward or reverse direction through operation of a three-positon Master Slew switch 80. In addition, the master may be indexed to the next fiche image area through operation of a Master Advance switch 82.

The apparatus may be operated in various modes, each of which is selected by way of a Mode switch 84. In the preferred embodiment, the apparatus is operable in any one of six different modes. As mentioned above, the control may be programmed from various input sources, including Remote Teletype, or master Bar Code. Any of these modes may be selected by switch 84. In addition, the apparatus may be operated in Manual, Search, or Verify modes. The Manual mode allows the operator to program the control for the number of copies of a particular fiche at the exposure station. When operating in the search mode, the control automatically positions the master film at an image area selected by the operator. In the Verify mode, a program line which was previously inputted to the control memory from a remote or teletype source may be executed. The particular line number is entered by the operator through the keyboard. The control panel is also provided with various indicator lamps, not illustrated, to inform the operator of certain conditions.

FIG. 2 of the drawings illustrates the basic control arrangement of the present invention. All program instructions and other data are processed by a main control 86 including a memory for storing program instructions and other data. The control may be programmed from a remote CPU or teletype device, as indicated by block 88. Alternately, program instructions may be provided from the keyboard, as indicated by block 90, or from a bar code reader shown as block 92. The reader is effective when the machine is operated in the Bar Code mode to sense data previously recorded on the master film in the form of a bar code, generally indicated by the numeral 94. Preferably, the bar code is located along one edge of the master film and offset slightly from the image area 96 containing the microfilm frames. It should be noted that, the data contained in the bar code may be recorded on the film in other ways, such as magnetically.

The master film is also provided with a series of image area marks 97 along the opposite edge of the film for each image area. The marks are sensed optically through an appropriate detector 98 and corresponding signals are fed to the control to keep count of the image areas and time operation of the reader. The marks may be either transparent or opaque, depending upon the type of film being utilized. After the program instructions or order data have been entered into the control memory, operation may be initiated, whereby both the duplicator and sorter mechanisms are controlled in accordance with the instructions.

FIG. 3 illustrates a perferred embodiment of the format of the bar code utilized for programming the control. The bar code is comprised of 21 data spaces, each divisible into "1" and "0" sections. Each section is scanned by a different channel of the read head 26. The data may be defined by either opaque or transparent areas in each of the data spaces, depending upon the type of film being utilized. The first data space is provided for a Starting Bit which scans both the "1" and "0" sections. This is followed by a Direction Bit which tells the control which direction the data is being scanned. For example, the direction mark in the "1" section would indicate forward scanning, while a mark in the "0" section would indicate reverse scanning. The next data space is provided for defining the sorter mode for either a collate or separate operation.

The first image area of a series of fiche to be copied in a run will contain a data bit in the "1" section. Each succeeding line image area within the run series contains a data bit in the "0" section when the sorter is to be operated in the collate mode. For operations in the separate mode, each of the image areas is treated as a new run and contains a data bit in the "1" section. The next seven data spaces are reserved for programming, in straight binary code, the number of copies to be made of the corresponding image area. In addition to defining the number of copies, the bar code also provides data for controlling the sorter positioning. When the sorter is operated in the collate mode, as determined by the data in the third space, the bar code for the first image area of a series run contains data which designates the starting bin location or position of the sorter. All bar codes for the subsequent image areas of the run series contain data bits in the "0" section of the sorter counter spaces. The nineteenth space is provided for a parity bit which is programmed with either a "1" or a "0" to produce an odd parity in the "1" section of data spaces 3-19. A direction bit is provided in the next space, which is the opposite of that appearing in the second data space. The last space is provided for a starting bit which is sensed by the reader when scanning in the reverse direction. Each bar code is preceded and succeeded by a gating area of predetermined length within which images are not permitted. These are dark on negative film and clear on positive film.

It will be appreciated that if the master bar code is not to be utilized to program the control for duplicator and sorter operations, the data spaces may be utilized for identifying a corresponding image area or fiche. The data spaces 4-18 may be utilized for this purpose to allow the control to verify which image area is presented to the exposure station. As the master film is moved in the forward or reverse direction, the control keeps track of the image areas by counting the marks 97 detected by sensor 98. When operating in the remote or teletype modes, the control may be programmed to verify that the fiche identification data from the bar code corresponds to the counter data accumulated from the fiche mark sensor.

When a control is programmed from a CPU, or other remote peripheral, each program line entered consists of five 8-bit words formated as illustrated in FIG. 3a. The first bit of the first data word is utilized to define whether or not the particular fiche is the first fiche of a run series. The second bit defines either a collate or separate mode of operation for the sorter. The next bit defines whether not not the image area count accumulated by sensing fiche area marks is to be verified by reading a verification type bar code on the master film. In the preferred embodiment, the fourth bit of the first word is not utilized. The remaining four bits of the first data word define the most significant portion of the image area number to be copied.

The second data word is reserved for defining the least significant portion of the image area number to be copied. Bin position data for the sorter is defined by the third word. If the sorter is to be operated in a collate mode, the third word determines the start bin location for a run series. If the sorter is to be operated in the separate mode, this data defines the bin to receive all fiche copies of the particular image area. The fourth data word is utilized to define a particular run or job number for the program line. Data corresponding to the number of copies to be made is provided by the fifth word.

When the control is programmed from a teletype input, a standard teletype data format, such as ASCI code, is utilized. The actual information content is the same as that of the above-described Remote data format. An example of teletype data would be as follows: 1, 1, C, 1, 83, 16, B. This instruction tells the control that program line 1 is for the first job and must be collated starting at sorter bin position 1. The control is instructed to index the master film to image area 83 and make sixteen copies of such after verifying by way of reading the verification type bar code and comparing with the accumulated image area counts.

FIG. 4 is a simplified block diagram of the control system associated with the present invention. Control is provided through a programmed central processing unit, or CPU, 100 and a programmable read only memory (PROM) 102. In the preferred embodiment, the CPU is a commercially available microprocessor, such as the Intel Corp. No. 8008 Microprocessor. A random access memory (RAM) 104 is provided for storing program instructions and the like received from the various input sources. Preferably, the RAM contains sufficient memory for 350 program lines with five data bytes per line. The inputting and outputting of all data is handled through a main data bus 106, connected to the CPU and memories through appropriate interfaces. Data received from the teletype or remote CPU is also handled through the data bus. For the most part, this data is comprised of instructions which are read into RAM 104 under control of the CPU 100 and program in PROM 102.

Program instructions may also be received from a bar code reader 108 through one of the Input/Output (I/O) boards 110. Program instructions from the keyboard and various machine switch functions indicated by block 112 are also fed to the data bus through I/O boards 110. The output display circuitry 114 in the main control panel 58 is also controlled by the data bus 106 through I/O board 110. While FIG. 4 illustrates the general configuration of the control circuitry, it is not intended that the present invention be limited to this specific configuration or to the use of any particular microprocessor.

In the preferred embodiment, the control circuit components are disposed on a group of plug-in circuit boards located in a control module in a lower section of the machine. FIG. 5 is a schematic block diagram of the circuit boards corresponding to block 107 of FIG. 4. This board handles data between the control and a teletype or other remote source. Preferably, the electrical interface for the remote and teletype communications is a direct current 20 milliamp signal loop operated in a half duplex mode. The input and output current loops are indicated by blocks 116 and 118, respectively. Data received from a teletype is input serially at block 120 at a rate of 110 baud. Remote input data is received through block 122 at 9600 baud. A crystal oscillator 124 provides a time base for handling data from data bus 106. A baud select control 126, together with a baud rate select circuit 128, determine the baud rate at which the data is to be handled. Normally, this rate is 110 baud for teletype communications. Operation of the Remote Initiate switch on the main control panel causes commands from the CPU to cause circuits 126 and 128 to change the baud rate from 110 to 9600. This conditions input control 130 and output control 132 to handle the data at the specified rate.

The data from the teletype or remote inputs is handled through an Input Select Control 134 in accordance with commands received via the data bus. The input data is handled through a shift register 136 controlled through input control 130. This data is shifted to an input holding register 138 by strobe signals from decoder 139 before being placed on the data bus.

Outgoing data from the bus is handled through an output holding register 140 and an output shift register 142 to either remote output circuit 144 or teletype output circuit 146. The remote Initiate switch, when operated, in addition to causing a shift to 9600 baud, causes a synchronization character to be sent to the remote source. A transfer of data from the remote source is initiated upon receipt of a synchronization character acknowledgment from the remote source. If the remote source does not respond within a predetermined time interval (say 5 seconds), an error signal will be displayed at the main control panel.

Figure 6:
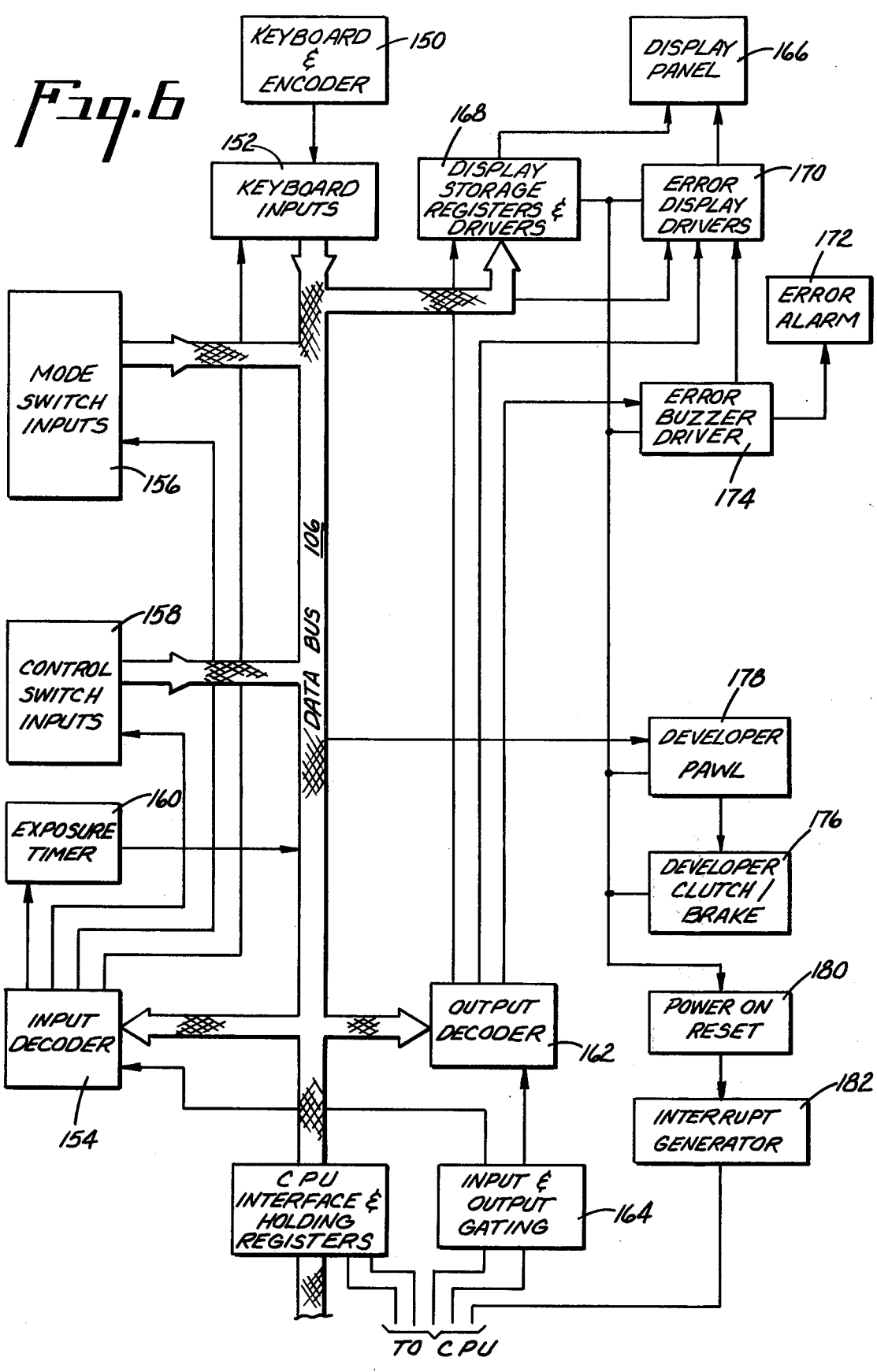
FIG. 6 is a block diagram of a first input/output circuit board of the control system.

Referring to FIG. 6, operation of a first one of the I/O circuit boards may be more fully understood. The data generated from the keyboard and associated encoder, indicated by block 150 is inputted to the data bus through a keyboard input circuit 152 controlled by an input decoder 154. This decoder also controls the inputting of data from the mode switch input 156 and control switch inputs 158, including Master Slew (Forward-/Rev.). In addition, exposure timer data is inputted at the block 160 under control of input decoder 154. The CPU, under control of the program, periodically polls these inputs in search of data to be placed on the bus. Data is outputted from the bus under control of an output decoder 162, which together with input decoder 154 is controlled by Input/Output gating circuit 164. The display on the main control panel indicated by numeral 166 receives display data from the bus through storage registers and drivers 168. Error display drivers 170 are provided for causing display of appropriate error information in the event of a malfunction or the like. Preferably, the device is also provided with an error alarm 172 energized under control of an error buzzer driver 174.

Operation of the developer unit described above is achieved through a developer clutch and brake mechanism. The gas chamber seal is formed by lowering the developer head through engagement of a developer clutch and brake mechanism indicated by block 176. Clutch is engaged for one-half revolution of the drive shaft under control of a developer pawl indicated by block 178. When a section of copy film corresponding to a fiche is in position at the developer station, signals are provided from the control via the data bus to actuate the developer pawl 178 to engage clutch 176 and lower the developer and form the gas tight chamber. After development has been completed and ammonia purged from the chamber, the developer pawl is again actuated momentarily to engage the clutch to allow a one-half revolution shaft to raise the developer head. The I/O circuit illustrated in FIG. 6 is provided with a Power On Reset circuit 180 which prevents erroneous operation of the various output circuits due to noise or the like when the power is applied. An Interrupt Generator 182 is also provided which is effective to initiate a program start-up sequence, including erasure of the RAM memory.

Figure 7:
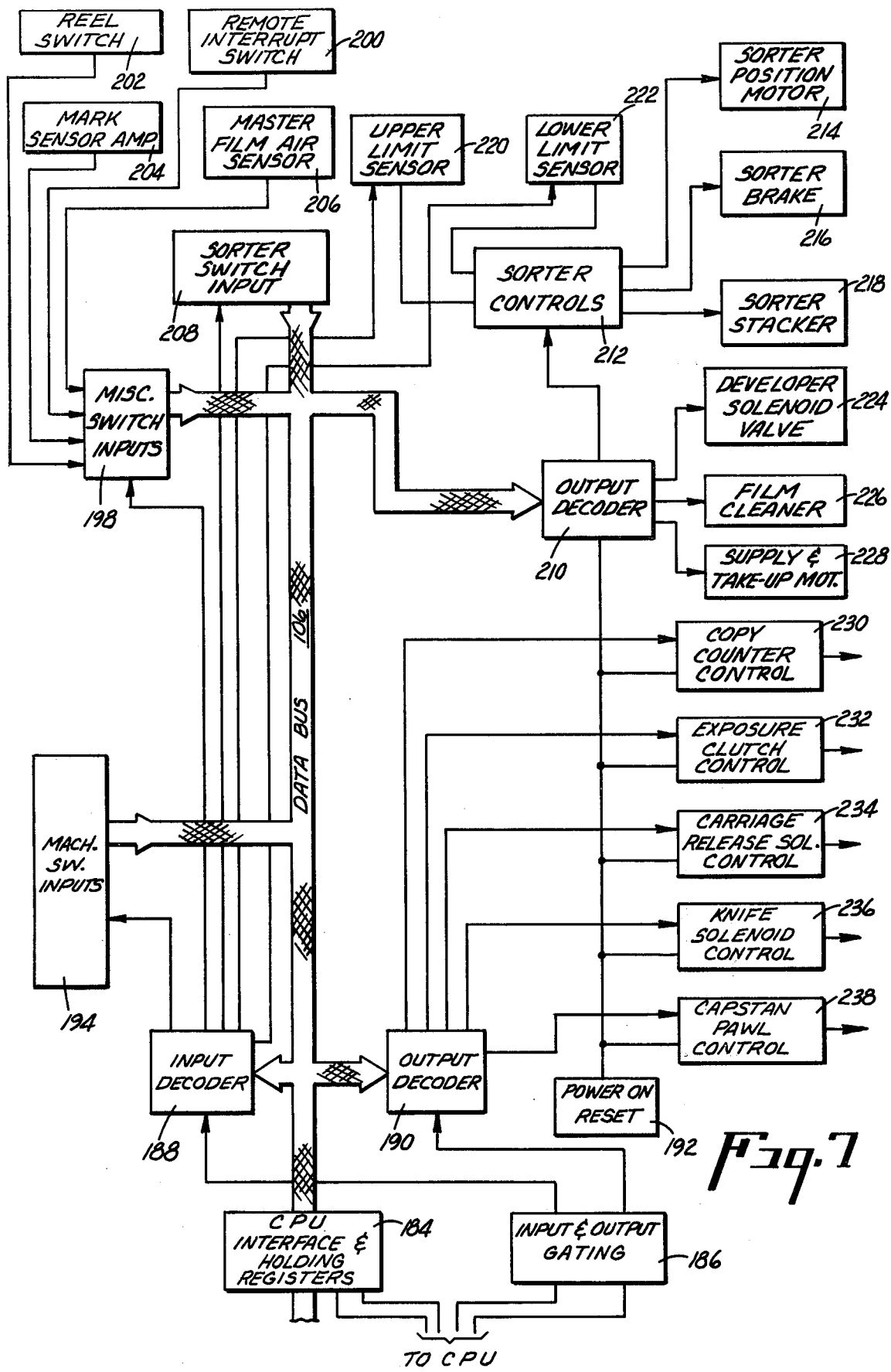
FIG. 7 is a block diagram of a second input/output circuit board of the control system.

FIG. 7 is a schematic diagram of a second I/O board associated with the control system of the present invention. Generally, the scheme of operation of this board is the same as that described above relative to FIG. 6. Input/Output Gating circuitry 186, input and output decoders 188 and 190, and a power reset circuit 192 are provided which are similar to those provided for the I/O board illustrated in FIG. 6. Various machine switch inputs are provided as indicated by block 194 to inform the control of the condition or position of various mechanical components of the apparatus. These inputs include up/down exposure platen switches, carriage switch, up/down developer platen switch, film out switch, and copy capstan switch. Other switch inputs are provided through block 198. These include the Remote Interrupt switch 200, Reel switch 202, Mark Sensor Amplifier input 204 and Master Film Air sensor 206. Various mechanical switch inputs associated with the sorter are also provided to the data bus as indicated by block 208. These include the Home switch, Mode switch, Hold switch and Forward/Reverse rotate switch.

An output decoder 210 provides command signals to sorter control 212, which controls position motor 214, brake 216, and sorter stacker functions 218. The sorter has upper and lower limit sensors 220 and 222, respectively, which serve to inhibit operation of the sorter beyond the upper and lower limits. Decoder 210 also furnishes commands to the developer solenoid valve 224 to control the flow of ammonia to the developer station. Commands are also provided to a film cleaner 226 and supply and take-up motors 228 for the master film.

Output decoder 190 provides commands to a copy counter control 230 which keeps track of the fiche copy count. The exposure clutch control 232 also receives commands for operating the exposure shutter to hold such open during a predetermined time interval. The exposure platen carriage is movable between the exposure station and a loading position. The carriage is pushed into the exposure station manually and held there by an appropriate latch mechanism. This latch mechanism is released through operation of a carriage release solenoid, the control for which is indicated by block 234. The rotary knife for cutting the copy film into fiche is operated through a knife solenoid control 236 which also receives commands through output decoder 190. The copy film is advanced one fiche length through operation of a capstan pawl which releases a clutch for one rotation corresponding to a fiche length. The capstan pawl is operated by a control indicated by block 238.

Figure 8B:
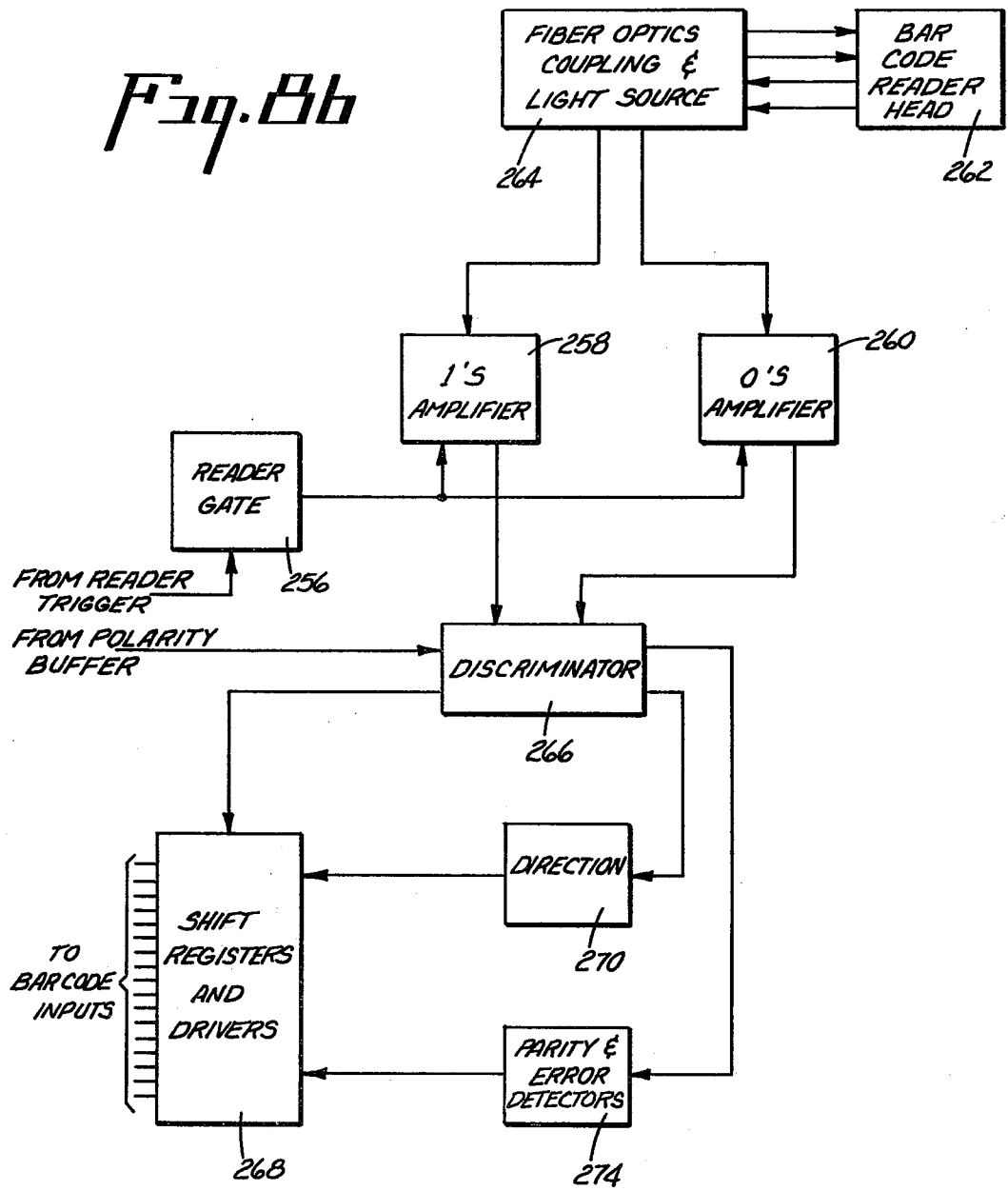

Referring to FIGS. 8a and 8b, operation of the third I/O board and the related bar code reader circuitry may be more fully understood. As explained above, the master film is advanced by a transport in response to commands from the control system. The transport includes a master stepper motor indicated by numeral 240 in FIG. 8a. Commands are received from the data bus by way of an indexer output control 242 which provides strobe signals through block 244 and direction data is indicated by block 246. The strobe and direction output signals are processed by an indexer control 248, the output of which is fed to indexer drivers indicated by block 250.

Several thumb wheel inputs are provided to the data bus as indicated by block 252. These are utilized by the control to turn the bar code reader on and off and to stop the master transport to accurately position an image area at the exposure station. In the preferred embodiment, signals from the mark sensor amplifier 204 in FIG. 7 are utilized by the control to turn on the bar code reader after a predetermined number of motor steps set by one of the thumb wheel inputs. This is achieved through a bar code reader trigger circuit 254 in response to commands received from the control over the bus. Signals from the reader trigger 254 operate reader gate 256 shown in FIG. 8b which allows bar code data to pass through amplifiers 258 and 260. In the preferred embodiment, the car code reader head indicated by block 262 operates by way of fiber optics coupling and an appropriate light source both shown as block 264. A discriminator circuit 266 receives the outputs of amplifier 258 and 260 and feeds the resultant data to shift registers and drivers indicated by block 268. A direction detector circuit 270 controls the direction in which the data is loaded into the shift registers depending upon whether the bar code is read in the forward or reverse direction. A film polarity buffer 272 provides a signal to the discriminator indicative of the type of bar code being read (positive or negative). A parity and error detector 274 analyzes the bar code for improper parity or other errors and provides corresponding signals to the shift register and driver circuit 268. In the event of an error, a bar code status input circuit 276 will provide corresponding input signals to the data bus. If there are no errors, the bar code data is provided to the control memory via the bus through the input circuit indicated at 278.

The I/O circuit board illustrated in FIG. 8a also receives control panel switch input as indicated by block 280. These inputs include copy start and stop, master rewind start and stop, master advance, platen eject, and copy film jog. These inputs are placed on the data bus and utilized by the control for overseeing the duplicator and sorter operations.

Figure 9A:
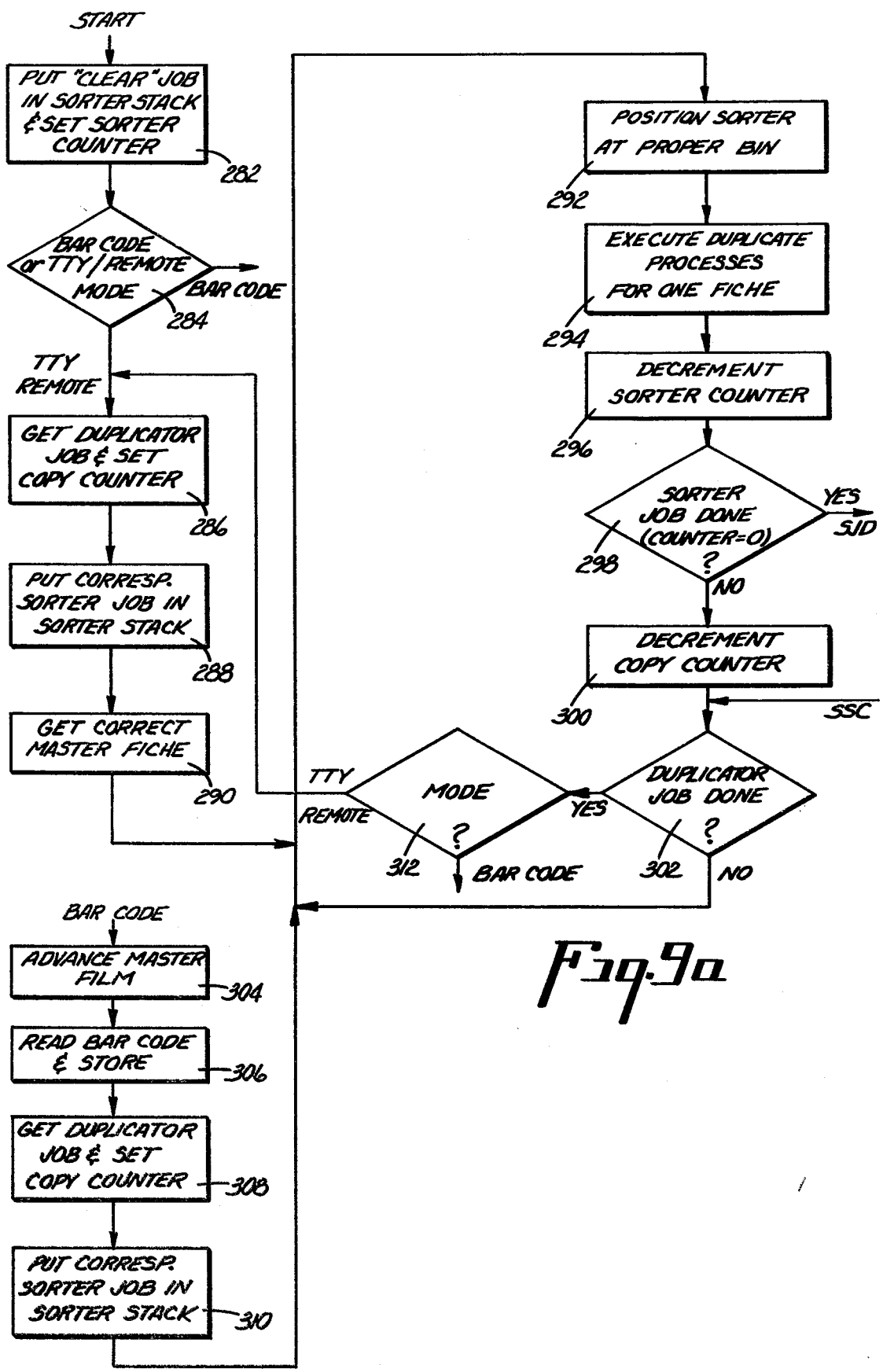
FIGS. 9a and 9b are simplified flow charts of a portion of the control program for operating the duplicator and sorter.
Figure 9B:
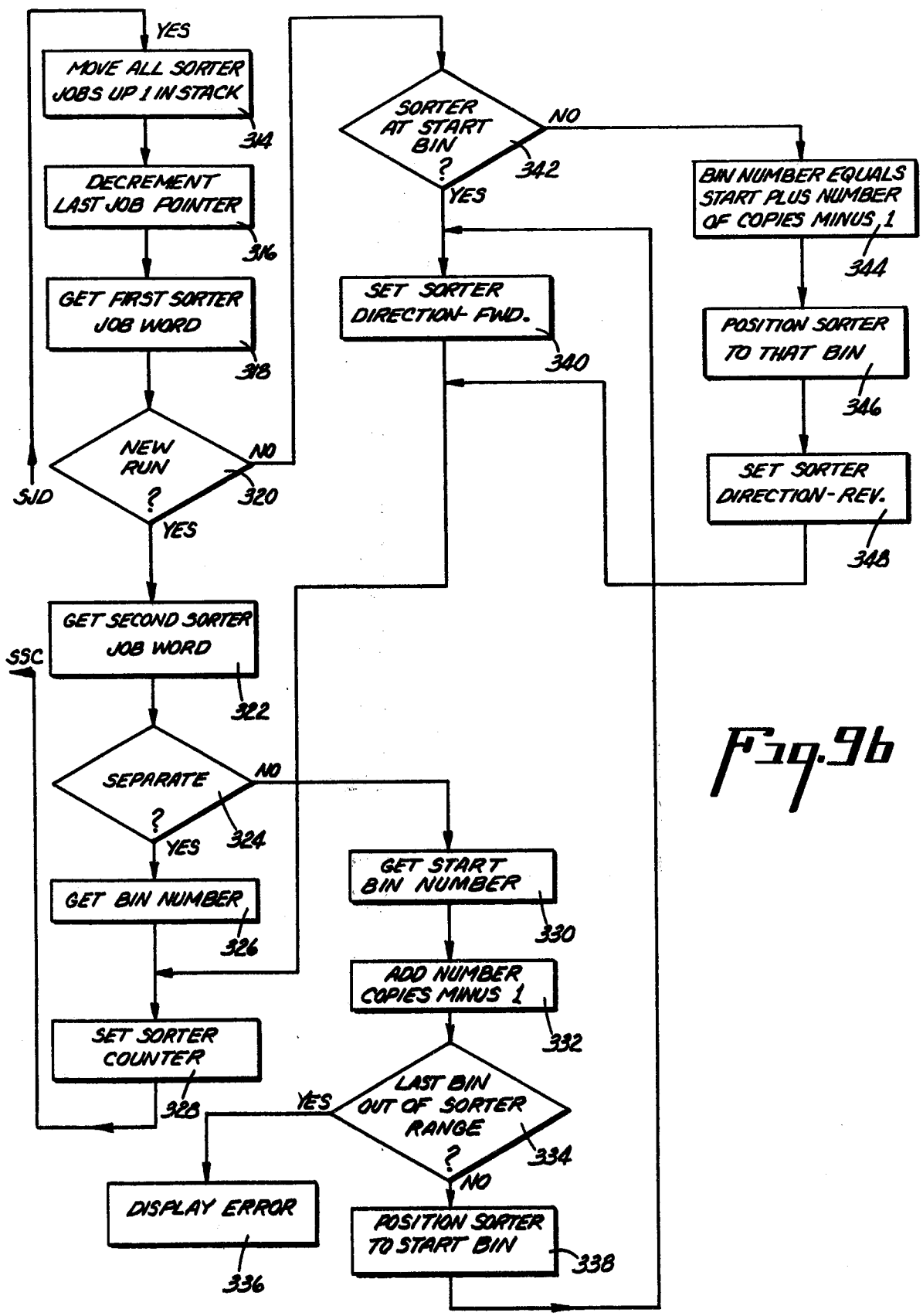

Referring to the flow chart illustrated in FIGS. 9a and 9b, operation of the duplicator and sorter by the control program may be more fully understood. Briefly, the control must synchronize the duplicator operations, including those at the various stations with each other and with operation of the sorter. In the preferred embodiment, there are four fiche frames separating the sorter from the exposure station. In effect, this means that each of the sorter operations is spaced in time or steps by an amount corresponding to four duplicator cycles. When the control has been programmed from a remote or teletype source, the program jobs are operated on separately for the duplicator and sorter functions. The program instructions for the sorter jobs are arranged in stacked formation in the memory. In this way, the control operates on a sorter job four duplicator cycles after the corresponding duplicator job. It will be appreciated that after the last fiche area of copy film has been exposed, and the machine is to be shut down, there are four unprocessed fiche remaining which must be processed and fed to the appropriate sorter bins. In doing so, four fiche lengths of unexposed copy film are advanced past the exposure station to clear the machine. Thus, when the machine is restarted, the blank fiche must be cleared from the machine. This operation is handled by the control program and is indicated by block 282 in FIG. 9a. In the preferred embodiment, the "clear" job designates first sorter bin to receive the blank fiche and the sorter counter is set at four. The control then determines whether the instructions are from bar code or teletype/remote sources as indicated by test block 284. If the program instructions are from a teletype or remote source, the control program obtains the instructions for the first duplicator job from memory. These instructions include the master image area identification and the number of copies to be made. They may also call for bar code verification of the image area I.D. In addition, the program sets the copy counter in accordance with such instructions as indicated by block 286.

The corresponding sorter job instructions are placed into the sorter stack memory as indicated by block 288. These instructions include sorter mode (collate or separate), start bin position and the number of copies. The program utilizes the master I.D. data and commands the master transport to present the corresponding master image area to the exposure station. This is generally indicated by block 290.

The control program then positions the sorter at the proper bin as indicated by block 292. It will be appreciated, if the "clear" job has been placed on the stack, the control will hold the sorter at the designated bin position until all blank fiche have been received. This occurs as the various duplicator processes are executed by the control and requires four machine cycles. Block 294 corresponds to the processes executed by the duplicator for one fiche or machine cycle. These operations include exposing, developing, and cutting the copy films. Since the cutting station is spaced from the development station by two fiche lenghts, the section of copy film in between is not operated upon during each duplicator cycle.

After each duplicator cycle, the sorter counter is decremented as indicated by block 296. The control program then determines whether the sorter job being operated upon at the top of the sorter stack has been completed, as indicated by test block 298. If the job has not been completed, the copy counter is decremented at 300 and the program determines whether or not the duplicator job being operated upon has been completed as illustrated by block 302. If the job has not been completed, the program repeats operations for blocks 292 through 302.

It will be appreciated that the above-described subroutine for making fiche is substantially the same for bar code data, with the exception that the master film is advanced only one image area after each duplicator job has been completed. This is indicated by block 304. As the master film is advanced, the bar code for the next image area is read and the corresponding data loaded into a buffer memory. This operation is generally indicated by block 306. The control program then proceeds to get the duplicator job instructions from the stored bar code data and sets the copy counter accordingly as indicated by block 308. The corresponding sorter job instructions are then placed in the sorter stack, as shown by block 310. The program then proceeds to steps 292 through 302 and repeats such until the duplicator job has been completed. Upon completion of a duplicator job, a mode test is made as indicated by block 312 and the subroutine is repeated, starting either with Bar Code or TTY/Remote area.

When a sorter job has been completed as determined by test 298, the program proceeds to the next sorter job by moving all sorter jobs up in the stack. This is indicated by block 314. The "Last Job" pointer for the job stack is then decremented as shown by block 316. The instructions associated with each sorter job are comprised of two job words, the first of which contains data indicating whether the job is the first job in a new run or series of jobs and the number of copies to be made. The second sorter job word includes the sorter mode (collate or separate) and the sorter bin number. The program obtains the first sorter job word and determines if such is for a new run. These steps are indicated by block 318 and 320, respectively.

In the event of a new run, the program gets the second sorter job word and determines whether the sorter is to collate or separate the fiche copy, as indicated by blocks 322 and 324, respectively. If the job is to be separated, all fiche copies will be directed to a designated sorter bin. The program obtains the bin number, as indicated at block 326 and sets the sorter counter accordingly, as shown by block 328. The program then proceeds back to the duplicator loop for making fiche copies.

In the event that the copies are to be collated and the sorter job is for a new run, the program obtains the start bin number for the collation operation. This is shown in block 330. The number of copies from the first job word is added to the bin number less one as indicated at block 332 to arrive at the bin number which will receive the last fiche copy of the job. The program then determines whether the last bin is beyond the sorter range as indicated by test block 334. If the last bin is out of range, an error signal is displayed at the main control panel. This operation is indicated by block 336. If the last bin is within the sorter range, the control positions the sorter at the start bin as shown by block 338 and sets the sorter direction for forward operation as shown by block 340. The sorter counter is then set for the number of copies and the program returns to the copy loop.

At this point, it should be noted that the sorter job words are formated such that the first word indicates a "new run" for all separate operations. This is because each separate operation requires a separate sorter bin. For all jobs which are to be collated, the first job in a run determines the sorter start bin, with all subsequent jobs in the run being referenced to the specified start bin. Thus, if the first job word indicates it is not a new run, the program refers to the previously stored second job word for the entire run of collated jobs.

It should also be noted that for collation operation of the sorter, the sorter will be at the original start bin at the end of the even number sorter jobs. The program makes this determination as indicated by test block 342. If the sorter is at the start bin, the sorter is set for forward operation as shown at block 340. At the end of an odd number job, the sorter will not be at the start bin, but rather at a bin determined by the number of copies in the last job. The program determines the new bin to receive the first fiche copy of the next even job such that the job ends at the start bin. The new bin number will be equal to the start bin plus the number of copies less one. This is indicated by block 344. The control then positions the sorter at that bin and sets the sorter for operation in the reverse direction, as indicated by blocks 346 and 348, respectively. The sorter counter is then set (block 328) and the program returns to the copy loop.

Referring to FIG. 10 of the drawings, the manner in which the control oversees a duplicator cycle operation may be more fully understood. In essence, FIG. 10 is a flow chart for a subroutine corresponding to the operations generally indicated at block 294 in FIG. 9a. Since the copy operation utilizes an elongated web of copy film, it is essential that the stations and related functions be accurately synchronized with each other and with operation of the sorter. In addition, the control must oversee certain timing functions associated with the exposure and developer stations. As mentioned above, the main control panel is provided with an exposure time control which is set by the operator to provide the proper exposure time for the particular copy film being utilized. Exposure is controlled by timing operation of the shutter with the time remaining in the exposure interval being stored in a time-out register which is checked periodically by the program to determine if the time interval has expired, whereby the shutter should be closed.

At the beginning of each duplicator cycle, the time-out register or switch is cleared by the program as indicated by block 350. This register serves as a flag that the exposure time is completed. Lowering of the developer head is initiated, as indicated by block 354, through operation of the developer pawl. The program then tests to determine whether the developer head has reached the lower position. This condition, sensed by a switch, is inputted to the data bus to the control. This test operation is indicated by block 356. When the developer head is fully lowered, the program sets the developer down-time and ammonia in-times as indicated by block 358. The ammonia solenoid valve is operated to deliver ammonia to the development chamber, as indicated by block 362. As the developing process is being carried out, the program attends to the exposure operations, first by testing to see if the exposure carriage is in the exposure position, as indicated by test block 364. If this test is positive, the exposure shutter is triggered as shown in block 366 and the exposure timer is started as indicated by block 368. Under some circumstances, the carriage may not be in exposure position, in which event the negative result of test 364 causes the program to by-pass triggering of the shutter. This condition may occur, for example, at the end of a copy run for developing and cutting the last fiche copy and clearing the machine. Regardless of whether or not the shutter is triggered, the program starts the exposure timer as indicated by block 368. At this stage, the program checks the development operation and decrements the ammonia in time as indicated by block 370. In addition, the program goes to a sub routine at 372 to check the exposure operations. Basically, the sub routine effects closure of the exposure shutter upon time-out and then sets the time-out flag. These steps are completed until the ammonia in time has expired, as determined by test 374.

Upon expiration of the ammonia in time, the control operates the ammonia solenoid valve to cut off further flow of ammonia to the development chamber. This operation is indicated by block 376. The control then decrements the developer down time and again checks the exposure for time out as shown by block 378 and 380. These steps are repeated until the down-time has expired, as determined by test 382. At this point, the control provides commands over the data bus to raise the developer head. This operation is shown by block 384. The program then gets the time-out register at 386 and tests to see if the exposure has timed-out, by blocks 386 and 388, respectively. If the exposure is not yet timed-out, these steps are repeated, together with an exposure check sub routine as shown by block 390. When the exposure has timed out, both the developer and exposure operations are complete and the copy film is ready to be advanced. At this stage, a test is made at 392 to determine if the copy film has been exhausted. This is determined by the input from the copy film out switch. If copy film is remaining, the control advances the film one fiche length and causes operation of the cutter as indicated by block 394. Control is then returned to the routine, shown in FIG. 9a. In the event that the copy film is exhausted, an appropriate error signal is displayed at the main control panel. This is indicated by block 396.

From the foregoing description, it will be appreciated that the control system of the present invention provides a versatile means for controlling both duplicator and sorter operations in response to program instruction received from various sources. Since the system is capable of receiving instructions from teletype and remote sources, customer orders may be placed quickly and conveniently over long distance lines and be processed immediately. The fiche copies are automatically collated and separated and, as such, may be shipped or mailed without additional handling, otherwise required for a separate sorting operation.

The unique master bar code provides the means for preprogramming instructions on the master film roll when such is produced. This allows customers to place orders for a particular fiche run on the master roll, without the need for sending specific program instructions. Since the bar code data is formated to contain sorter control instructions, the customer orders are completely processed automatically, including collation or separation of the fiche copies.

While one embodiment of the invention has been shown and described, it will be obvious that other adaptations and modifications may be made without departing from the true spirit and scope of the invention.

What is claimed is:

1. An apparatus for producing sorted fiche copies of a master, said apparatus comprising:

an exposure station, a master film comprising a series of image areas each corresponding to fiche copies to be produced, said master film bearing order data for each of said image areas, said order data comprising data representative of the number of copies to be made of the corresponding image area and sorter control data comprising start position data representative of a sorter position for the first fiche copy, master transport means for presenting individual master film image areas to said exposure station in response to master transport command signals, means for supplying copy film, copy film transport means for presenting sections of said copy film to various stations in response to copy transport command signals, said exposure station including means for exposing a presented section of said copy film with an image of the presented master image area, reader means including means for reading said order data from said presented master image area, memory means for storing said order data received from said reader means, a developing station for developing said exposed copy film, an output station for dispensing said developed copy film in the form of fiche copies, sorter means for receiving said fiche copies from said output station, said sorter means having a plurality of bins and corresponding sorter positions for receiving the fiche copies, said sorter means including motive means responsive to sorter command signals for causing movement to corresponding stations, counter means for providing count signals indicative of the number of fiche copies which have been produced of an image area, control means comprising:
first means for providing duplicator command signals for controlling operation of said process stations in sychronism, second means for providing said copy transport command signals for causing said copy film transport means to present said copy film sections to said process stations in sychronism with their operations, third means for providing sorter command signals to said sorter motive means in accordance with said order data and said count signals to cause positioning of said sorter means at particular fiche-receiving positions, fourth means for providing said master transport command signals for causing operation of said master transport means to present the next image area to said exposure station in response to completion of the processing and sorting of the required number of fiche copies called for by said order data.

2. The apparatus set forth in claim 1 wherein said sorter control data includes sorter mode data representative of either a separate mode or a collate mode of operation.

3. The apparatus set forth in claim 2 wherein for any presented image area said third means provides said sorter command signals to said sorter motive means to sequentially position said sorter means at each of the particular fiche-receiving positions in accordance with the associated difference between the count of the actual number of fiche copies produced from the presented image area as represented by an associated count signal and the desired number of fiche copies to be produced from the presented image area as indicated by said order data when in the collate mode.

4. The apparatus set forth in claim 3 wherein said start position data is present for only the first said image area of said series of image areas when said mode data represents a collate mode of operation.

5. The apparatus set forth in claim 2 wherein said sorter command signals cause said motive means to keep said sorter at the position indicated by said start position data for the number of fiche copies called for by said order data when said mode data represents a separate mode of operation.

6. The apparatus set forth in claim 5 wherein said start position data is present for each said image area of said series when said mode data represents a separate mode of operation, and defines the sorter bin to receive the fiche copies of the corresponding image area.

7. An apparatus for producing sorted fiche film copies of a master, said apparatus comprising:
   an exposure station,
   a master film comprising a series of image areas each corresponding to fiche copies to be produced,
   master transport means for presenting individual master film image areas to said exposure station in response to master transport command signals,
   means for supplying copy film,
   copy film transport means for presenting sections of said copy film to various stations in response to copy transport command signals,
   said exposure station including means for exposing a presented section of said copy film with an image of the presented master image area,
   reader means including means for sensing the presentation of a said image area to said exposure station,
   memory means for storing data,
   peripheral means for providing order data comprising image area identification data, copy quantity data and sorter control data,
   means for inputting said order data to said memory means,
   a developing station for developing said exposed copy film sections,
   an output station for dispensing said developed copy film section in the form of fiche copies,
   sorter means for receiving said fiche copies from said output station, said sorter means having a plurality of bins and corresponding sorter positions for receiving the fiche copies, said sorter means including motive means responsive to sorter command signals for causing positioning at corresponding positions,
   counter means for providing signals indicative of the number of fiche copies produced of an image area,
   control means comprising:
      first means for providing duplicator command signals for controlling said process stations,
      second means for providing said copy transport command signals for causing said copy film transport means to present said copy film sections in sychronism with operation of said process stations,
      third means for providing sorter command signals to said sorter motive means in accordance with said order data and said count signals to cause positioning of said sorter means at particular fiche-receiving positions, and,
      fourth means for providing said master transport command signals for causing operation of said master transport means to present a particular said image area to said exposure station in accordance with said image area identification data.

8. The apparatus set forth in claim 7 wherein said sorter control data includes data representative of the particular fiche-receiving position of said sorter means to receive the first fiche copy.

9. The apparatus set forth in claim 8 wherein said sorter control data further includes collate command data, said sorter command signals causing said motive means to collate the corresponding fiche copies in accordance with said collate command data and said fiche-receiving position data.

10. The apparatus set forth in claim 8 wherein said sorter control data further includes separate command data, said sorter command signals causing said motive means to separate the corresponding fiche copies in accordance with said separate command data and said fiche-receiving position data.

11. The apparatus set forth in claim 8 wherein said order data includes data representative of an address location in said memory means, whereby the memory means may be accessed to carry out a particular job defined by the order data at said address location.

* * * * *